H. W. POTTS.
HEADLIGHT CONTROL FOR AUTOMOBILES.
APPLICATION FILED MAR. 28, 1913.

1,074,527.

Patented Sept. 30, 1913.

2 SHEETS—SHEET 1.

Witnesses
Wm. H. Mulligan.
R. M. Smith

Inventor
Harvey W. Potts
By Victor J. Evans.
Attorney

H. W. POTTS.
HEADLIGHT CONTROL FOR AUTOMOBILES.
APPLICATION FILED MAR. 28, 1913.
1,074,527.
Patented Sept. 30, 1913.
2 SHEETS—SHEET 2.
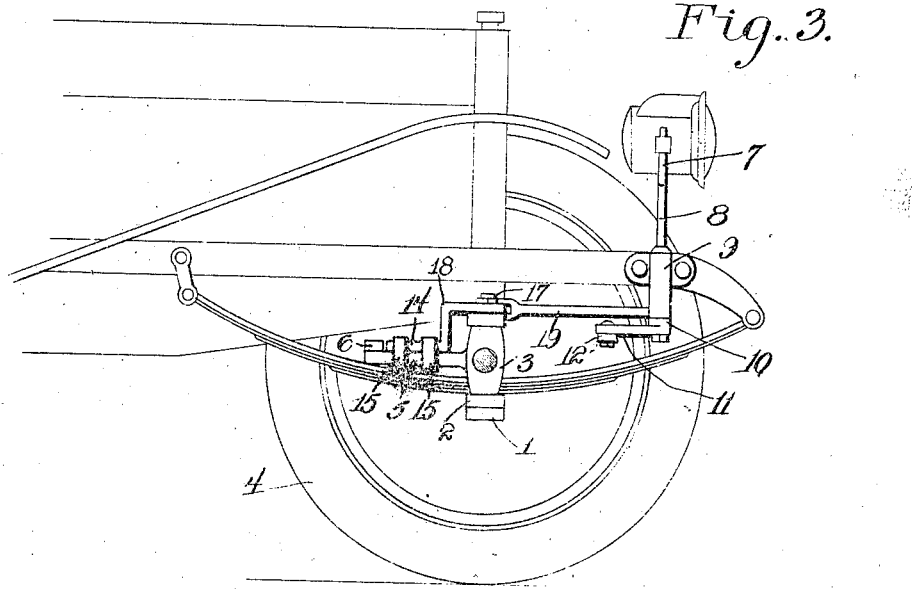
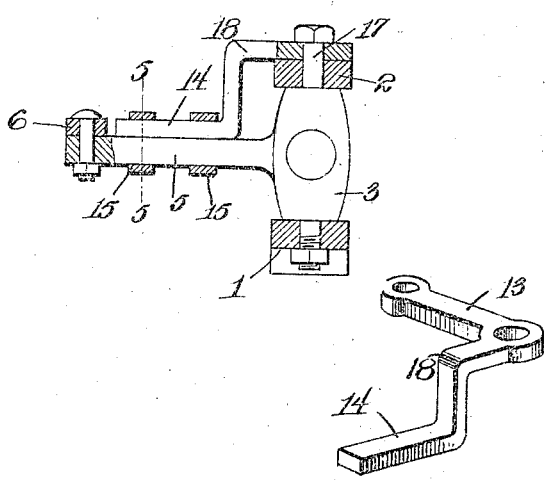
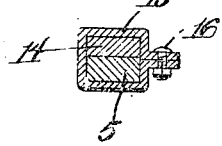
Witnesses
Wm. H. Mulligan
R. M. Smith
Inventor
Harvey W. Potts
By Victor J. Evans
Attorney

UNITED STATES PATENT OFFICE.

HARVEY W. POTTS, OF LONGMONT, COLORADO.

HEADLIGHT CONTROL FOR AUTOMOBILES.

1,074,527.

Specification of Letters Patent. Patented Sept. 30, 1913.

Application filed March 28, 1913. Serial No. 757,462.

*To all whom it may concern:*

Be it known that I, HARVEY W. POTTS, a citizen of the United States, residing at Longmont, in the county of Boulder and State of Colorado, have invented new and useful Improvements in Headlight Controls for Automobiles, of which the following is a specification.

This invention relates to headlight controls for automobiles and similar vehicles, the object in view being to provide simple mechanism by means of which the headlights are automatically turned in accordance with the angle of the steering wheels, so that the rays from the headlights are thrown forwardly in planes parallel to the path assumed by the steering wheels, thereby lighting that part of the roadway which is to be traversed by the machine, irrespective of the radius described by the machine in making a turn.

With the above and other objects in view, the invention consists in the construction, combination and arrangement of parts, as will be hereinafter more fully described, illustrated in the accompanying drawings, and pointed out in the claim hereunto appended.

Figure 1:
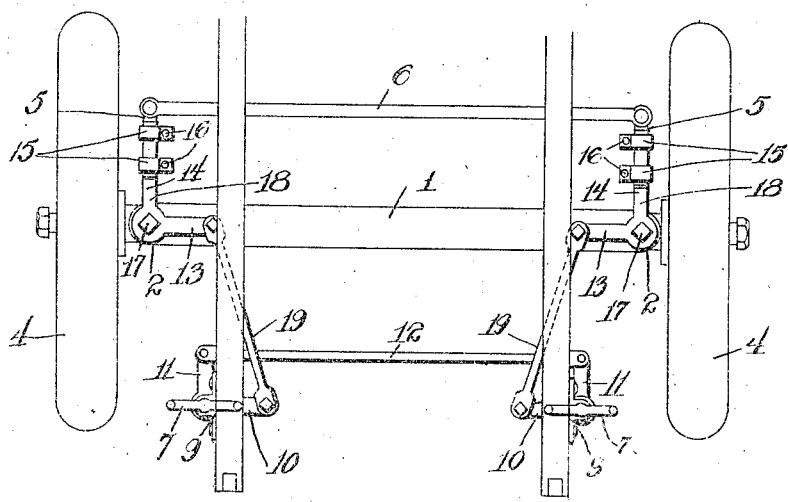
Figure 2:
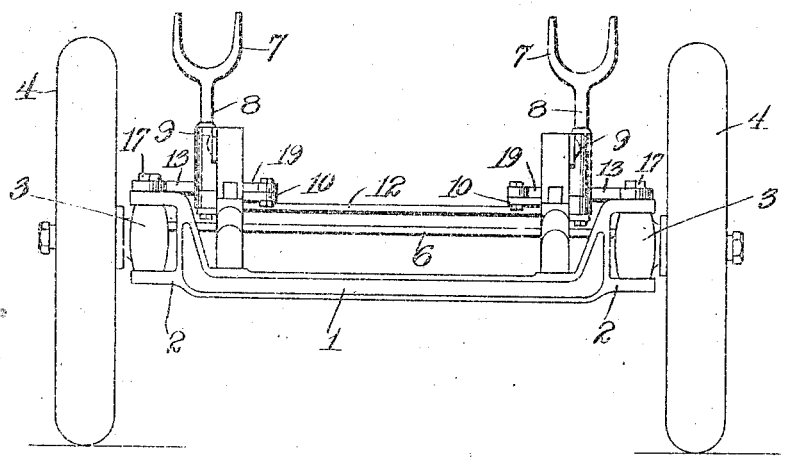

In the drawings: Figure 1 is a plan view of a sufficient portion of the running gear of an automobile to illustrate the application of the present invention thereto. Fig. 2 is a front elevation of the same. Fig. 3 is a side elevation thereof, partly broken away. Fig. 4 is a detail section on an enlarged scale, showing the relation of one of the elbow levers to the adjacent knuckle and its arm. Fig. 5 is a detail vertical section on the line 5—5 of Fig. 4. Fig. 6 is a perspective view of one of the elbow levers.

Referring to the drawings, 1 designates the front axle of an automobile, motor truck, or similar vehicle, said axle being shown as provided with the usual knuckle holding forks 2 at the opposite ends thereof, in which the vertical portions 3 of the steering knuckles are received and journaled to turn on vertical or substantially vertical axes in the ordinary manner. The knuckles 3 carry the spindles, on which the steering wheels 4 are journaled, and each knuckle is provided as usual with a projecting arm 5 extending longitudinally of the machine frame, the arms 5 of the oppositely located knuckles being coupled together by the usual connecting rod 6, causing both of said wheels to turn equally and simultaneously together.

In carrying out the present invention, the brackets 7 which support the headlights are provided with vertical shafts 8 extending downwardly therefrom and journaled in the chassis or machine frame, indicated at 9. The shafts 8 extend below the frame, and each of said lamp shafts has fast thereon an elbow lever comprising an arm 10 extending transversely of the machine, and another arm 11 extending at right angles to the arm 10, the arms 11 of the oppositely located elbow levers being coupled together by a connecting rod 12 which causes both of said elbow levers to swing equally and simultaneously, thereby imparting a corresponding movement to both of the headlights.

In connection with each of the knuckles 3, I employ another elbow lever, comprising an arm 13 extending transversely of the machine, and another arm 14 extending longitudinally of the machine and substantially at right angles to the arm 13. The arm 14 of each of the last-named levers extends in the same direction as the knuckle arm 5, and is securely fastened thereto, so as to swing therewith, by means of clamps 15, one of which is shown in detail in Fig. 5, wherein it is seen to consist of a metal strap bent to embrace the arms 5 and 14, and securely clamped around the same by means of a bolt 16. As shown in Fig. 4, the lever arm 11 is pivoted at the elbow thereof on the upper pintle 17 at the top of the knuckle 3, and said lever is bent or deflected downwardly, as shown at 18, to enable the extremity thereof to be fastened to the knuckle arm 5 in the manner shown and described. Each of the elbow levers last referred to is thus pivotally mounted on the same center as the knuckle 3.

The arms 13 of the last-named elbow levers are coupled operatively to the arms 10 of the other set of elbow levers by means of links 19 shown in the form of rods, said rods having a jointed connection at their opposite ends with the lever arms referred to, and the joint being sufficiently loose to admit of the necessary relative up and down movements of the frame or chassis and the axle, which movement is permitted by the usual springs interposed between the axle and the frame of the machine.

From the above description, it will be apparent that when the steering wheels 4 are turned in the act of steering the machine, the elbow levers will be given a corresponding movement, and a proportionate amount of movement will be imparted to the lamp shafts 8, and consequently to the brackets 7 and the lamps carried thereby, the arms of the several levers being so proportioned as to their length that the lamps will be turned to angles corresponding to the angles to which the steering wheels are turned. This causes the rays of light to be projected forwardly in lines parallel to the lines assumed by the steering wheels, and the portion of the roadway about to be traveled by the machine is thus illuminated.

What is claimed is:

The combination with the steering knuckles of an automobile or similar vehicle, of elbow levers having their axes of movement coincident with the axes of the steering knuckles, one arm of each lever being deflected and extended in the same direction as the knuckle arm, means for securing said arm of the elbow lever to the adjacent knuckle arm, lamp shafts journaled to turn on vertical axes, elbow levers fast on said lamp shafts, a connecting rod coupling the last-named elbow levers together for simultaneous and equal movement, and links extending in a fore and aft direction and connecting the remaining arms of the two sets of elbow levers so as to admit of the relative up and down motion of the steering wheel axle and frame of the machine.

In testimony whereof I affix my signature in presence of witnesses.

HARVEY W. POTTS.

Witnesses:
F. P. SECOR,
GRAY SECOR,
EDWARD POTTS.